M. EKSTROM.
SPRING FORK.
APPLICATION FILED NOV. 8, 1913.
1,096,417.
Patented May 12, 1914.
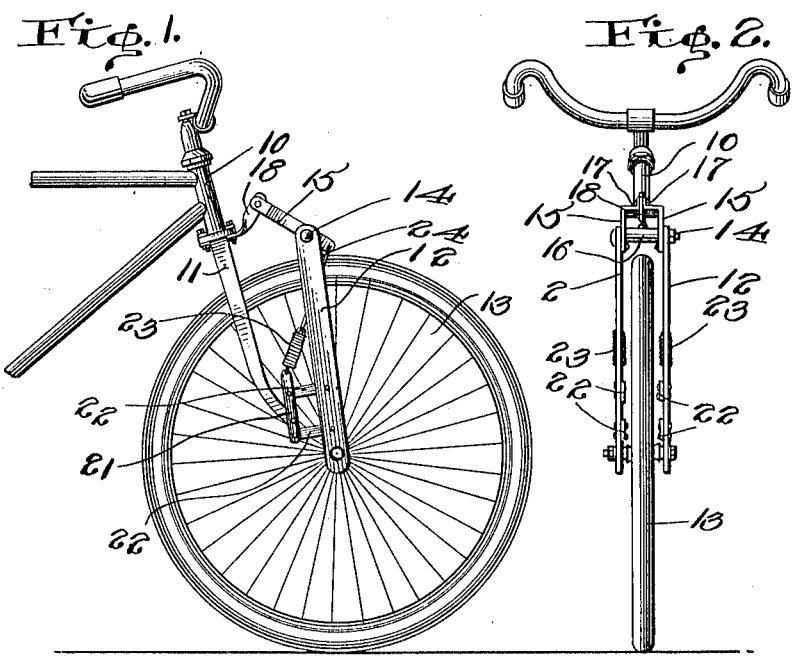
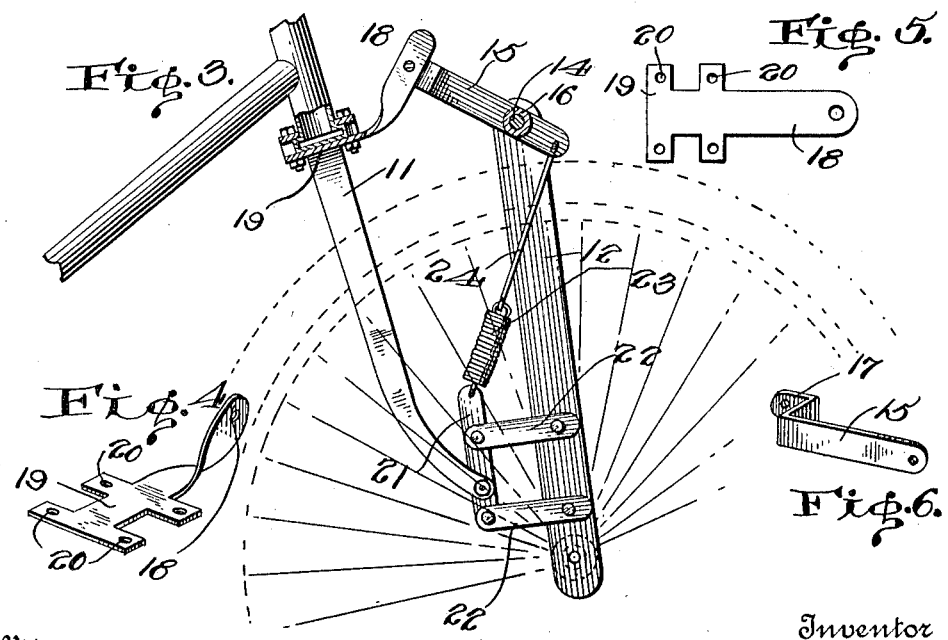
Witnesses
Howard H. Costello
Ross J. Woodward
Inventor
Martin Ekstrom
By C. E. Crooman
his Attorney

UNITED STATES PATENT OFFICE.

MARTIN EKSTROM, OF KIRON, IOWA.

SPRING-FORK.

1,096,417.   Specification of Letters Patent.   Patented May 12, 1914.

Application filed November 8, 1913. Serial No. 799,926.

*To all whom it may concern:*

Be it known that I, MARTIN EKSTROM, a citizen of the United States of America, residing at Kiron, in the county of Crawford and State of Iowa, have invented certain new and useful Improvements in Spring-Forks, of which the following is a specification, reference being had therein to the accompanying drawing.

This invention relates to an improved bicycle fork, and the principal object of the invention is to provide a fork which is so constructed that it will take up jolts due to running over uneven roads.

Another object of the invention is to so construct the fork that the various portions will be permitted to have very easy movement.

Another object of the invention is to provide an improved spring device for keeping the fork in its normal position.

Other objects and advantages of the present device will appear throughout the following specification and claims.

In the drawings: Figure 1 is a side elevation of the forward portion of a bicycle provided with the improved fork. Fig. 2 is a front elevation of a bicycle. Fig. 3 is an enlarged sectional view of the forward portion of a bicycle. Fig. 4 is a perspective view of the bracket which is secured to the post of the bicycle. Fig. 5 is a view of the blank from which the bracket shown in Fig. 4 is made. Fig. 6 is a perspective view of one of the links which are pivotally connected with the upper ends of the auxiliary forks.

In the accompanying drawings, the numeral 10 indicates the post of the bicycle frame in which the primary forks 11 are rotatably mounted. The auxiliary forks 12 are connected with the hub of the wheel 13 and have their upper ends connected by the bolt 14 upon which the links 15 are pivotally mounted. These links 15 are mounted upon the bolt 14 between the auxiliary forks 12 and are held in spaced relation by a sleeve 16. The inner end portions 17 of these links 15 are bent inwardly and are pivotally connected with the tongue 18 of a bracket 19 which bracket is secured to the primary forks 11 by means of bolts passing through the openings 20 formed in the side tongues of the bracket. Short strips 21 are pivotally connected with the lower ends of the primary forks 11 and are also pivotally connected with the auxiliary forks by means of the links 22. Springs 23 are connected with the upper ends of the strips 21 and are connected with the outer ends of the links 15 by means of the rods 24.

When this fork is in use, the springs 23 prevent the primary forks 11 from normally forcing the links 22 below the horizontal position. If the front wheel strikes an uneven place in the road, the jolt will cause the auxiliary forks to move vertically and this will cause the springs 23 to expand and contract, thus taking up the jolt and preventing the rider from being jolted. This construction will, therefore, permit the wheel to ride very easily since the several parts of the fork are pivotally connected together, and are yieldably held in normal position by springs.

What is claimed is:—

1. In a device of the character described, a pair of primary forks, a pair of auxiliary forks, a bracket carried by said primary forks, links pivotally connected with said auxiliary forks and pivotally connected with said bracket, strips pivotally connected with said primary forks, links pivotally connecting said strips with said auxiliary forks, springs connected with the upper ends of said strips, and rods connecting said springs with the outer ends of said first-mentioned links.

2. A device of the character described comprising a pair of primary forks, a pair of auxiliary forks, strips pivotally connected to the lower ends of said primary forks, links pivotally connected with the upper ends of said auxiliary forks and having their outer ends extending beyond said auxiliary forks, springs connected with the upper ends of said strips, rods carried by said springs and connected with the outer ends of said links, a bracket carried by said primary forks and pivotally connected with the inner ends of said links, and links pivotally connecting said strips with the lower end portions of said auxiliary forks.

3. A device of the character described comprising a pair of primary forks, a pair of auxiliary forks, strips carried by said primary forks, links pivotally connected with the upper ends of said auxiliary forks and pivotally connected with said primary forks, resilient means connecting said strips with the outer end portions of said links, and means for pivotally connecting said strips with the lower end portions of said auxiliary forks.

In testimony whereof I hereunto affix my signature in presence of two witnesses.

MARTIN EKSTROM.

Witnesses:
   REUBEN BULLER,
   CLARENCE A. AUDER.

---

Copies of this patent may be obtained for five cents each, by addressing the "Commissioner of Patents, Washington, D. C."